(12) United States Patent
Ohnishi (10) Patent No.: US 9,039,140 B2
(45) Date of Patent: May 26, 2015

(54) INKJET RECORDING METHOD AND RECORDING APPARATUS

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/386,819

(22) PCT Filed: Apr. 1, 2013

(86) PCT No.: PCT/JP2013/060008
§ 371 (c)(1),
(2) Date: Sep. 22, 2014

(87) PCT Pub. No.: WO2013/151021
PCT Pub. Date: Oct. 10, 2013

(65) Prior Publication Data
US 2015/0042711 A1 Feb. 12, 2015

(30) Foreign Application Priority Data

Apr. 4, 2012 (JP) ................. 2012-085873

(51) Int. Cl.
*B41J 2/15* (2006.01)
*B41J 2/045* (2006.01)
*G06K 15/10* (2006.01)
*B41J 2/21* (2006.01)

(52) U.S. Cl.
CPC *B41J 2/0451* (2013.01); *B41J 2/15* (2013.01); *G06K 15/107* (2013.01); *B41J 2/2139* (2013.01); *B41J 2/2142* (2013.01)

(58) Field of Classification Search
CPC .......... B41J 2/0451; B41J 2/15; B41J 2/2139; B41J 2/2142; G06K 15/107
See application file for complete search history.

(56) References Cited

FOREIGN PATENT DOCUMENTS

| JP | H06-040028 | 2/1994 |
|----|------------|--------|
| JP | H07-052389 | 2/1995 |
| JP | H11-216882 | 8/1999 |
| JP | 2005-067049 | 3/2005 |
| JP | 2006-150938 | 6/2006 |

OTHER PUBLICATIONS

"International Search Report (Form PCT/ISA/210) of PCT application", mailed on May 7, 2013, with English translation thereof, p. 1-p. 2.

*Primary Examiner* — Julian Huffman
(74) *Attorney, Agent, or Firm* — Jianq Chyun IP Office (57) ABSTRACT

The present invention addresses the problem of improving the quality of recorded images in ink jet recording technologies in which a plurality of nozzle lines that discharge ink of the same color are used. As a solution, nozzle lines (10) of n columns (where n is a natural number of three or more) each record a recording pixel column (2) on a recording medium by discharging ink of the same color while scanning over the recording medium (1); and when the nozzle lines (10) of n columns each extract a recording pixel column (2), which is recorded in a single scan, for each n columns in the scanning direction, ink is discharged in such a manner that there are at least two permutation patterns for the nozzle columns (10) that record each column of the extracted recording pixel columns (3).

7 Claims, 9 Drawing Sheets

INKJET RECORDING METHOD AND RECORDING APPARATUS

CROSS-REFERENCE TO RELATED APPLICATIONS

This application is a 371 application of an International PCT application serial no. PCT/JP2013/060008, filed on Apr. 1, 2013, which claims the priority benefit of Japan application no. 2012-085873, filed on Apr. 4, 2012. The entirety of each of the above—mentioned patent applications is hereby incorporated by reference herein and made a part of this specification.

FIELD OF THE INVENTION

The present invention relates to an inkjet recording technique and specifically relates to an inkjet recording technique using a plurality of nozzle arrays for ejecting the same color ink.

BACKGROUND ART

An inkjet recording technique using a plurality of nozzle arrays for ejecting the same color ink is, for example, described in Patent Literature 1 and Patent Literature 2.

In Patent Literature 1, a printer is described which includes a recording head unit structured so that a plurality of recording heads having a plurality of recording parts formed in a straight line-shaped array are arranged, respective recording part arrays on respective recording heads are parallel to each other, and straight line-shaped rows formed by the respective recording parts structuring the respective recording part arrays with the corresponding recording parts on adjacent recording heads are arranged so as to be perpendicular to the recording part arrays on respective recording heads.

Further, in Patent Literature 2, an inkjet recording apparatus is described in which a plurality of line heads provided along a recording medium conveying direction by a recording medium conveyance means is used and an image of the same color is recorded in a divided manner, and the inkjet recording apparatus includes an image data supply means, which supplies image data for forming an image of the same color in a divided manner to ejectable heads that are capable of appropriately ejecting ink in a plurality of the line heads for forming an image of the same color, and a control means which controls recording by the respective ejectable heads depending on image data supplied by the image data supply means.

CITATION LIST

Patent Literature

[Patent Literature 1] Japanese Patent Laid-Open No. Hei 6-40028 (published on Feb. 15, 1994)
[Patent Literature 2] Japanese Patent Laid-Open No. 2006-150938 (published on Jun. 15, 2006)

SUMMARY OF INVENTION

Technical Problem

However, in the conventional techniques, the respective nozzle arrays (recording part arrays, line heads) are repeatedly used in order and thus, due to the characteristic variation of the nozzle arrays, an unintended pattern may be generated repeatedly on an image after printing. Therefore, in the conventional techniques, high-quality printing is not attained.

In view of the problem described above, an objective of the present invention is to provide a technique for improving a recording image quality in an inkjet recording technique with the use of a plurality of nozzle arrays for ejecting ink of the same color.

Solution to Problem

An inkjet recording method in accordance with the present invention includes a scanning process in which nozzle arrays of "n" rows ("n" is a natural number of 3 or more) for ejecting ink of the same color are scanned on a recording medium along a scanning direction and the nozzle arrays respectively eject ink on the recording medium to respectively record recording pixel rows on the recording medium. Each of the nozzle arrays is comprised of one or more nozzle(s) aligned along a sub-scanning direction perpendicular to the scanning direction, and the nozzles of the respective nozzle arrays are aligned along the scanning direction and, in the scanning process, the respective nozzle arrays of the "n" rows eject ink so that, when the recording pixel rows recorded by one scanning are extracted every "n" rows along the scanning direction, the number of permutation patterns of the nozzle arrays for recording respective rows of extracted recording pixel rows is two or more.

In the conventional technique, recording pixel rows are recorded by using the permutation of the nozzle arrays in the recording head as it is. Therefore, when recording pixel rows recorded by using the nozzle arrays of "n" rows are extracted every "n" rows along the scanning direction, the number of permutation pattern of the nozzle arrays for recording the extracted recording pixel rows is one. Accordingly, variation of ejection characteristics of the nozzles may repeatedly appear every "n" rows with the same pattern on the recording image and thus the image quality may be lowered.

On the other hand, according to the above-mentioned structure, the number of permutation patterns of the nozzle arrays for recording respective rows of the extracted recording pixel rows is set to be two or more. Therefore, variation of ejection characteristics of the nozzles is prevented from repeatedly appearing in the recording image every "n" rows with the same pattern and influence on one image due to variation of the characteristics of the nozzle arrays is equalized and a further high-quality image can be formed.

In the inkjet recording method in accordance with the present invention, it is preferable that the nozzle arrays of the "n" rows are selected from "m" rows ("m" is a natural number of "n+1" or more) of the nozzle arrays provided in a recording head, and that the scanning process includes a reselection process in which the nozzle arrays of the "n" rows are reselected from the nozzle arrays of "m" rows.

According to this structure, an image is recorded on a recording medium while rearranging the nozzle arrays for ejecting ink. Therefore, the number of combinations of the nozzles for recording adjacent pixels is increased and influence on one image due to variation of the characteristics of the nozzle arrays is equalized and a further high-quality image can be formed.

Further, the viscosity of ink within a nozzle which does not eject ink is successfully prevented from being increased to cause a problem in ink ejection by reselecting and rearranging the nozzle arrays for ejecting ink.

The inkjet recording method may further include a failed nozzle detection process in which a failed nozzle is detected and, in the reselection process, a failed nozzle array including a detected failed nozzle is not selected.

According to this structure, recording can be appropriately performed without using the failed nozzle array and thus, even when a failed nozzle is occurred, recording can be continued without exchanging the head.

The inkjet recording method in accordance with the present invention may further include a failed nozzle detection process in which a failed nozzle is detected and, in the scanning process, when ink is to be ejected from the detected failed nozzle, ink is ejected from a substitute nozzle instead of the failed nozzle, and the substitute nozzle is selected so that a recording pixel which is to be originally recorded by the substitute nozzle and a recording pixel which is to be recorded by the failed nozzle are not adjacent to each other.

According to this structure, even when a failed nozzle is occurred, recording can be continued by substituting a substitute nozzle for the failed nozzle without exchanging the head. Further, the substitute nozzle is selected so that a recording pixel recorded by the substitute nozzle and a recording pixel to be recorded by the failed nozzle are not adjacent to each other. Therefore, even when a failed nozzle is occurred, recording can be continued at a speed corresponding to the number of the nozzles except the failed nozzle in the same line of the failed nozzle (line extending in the scanning direction).

In the inkjet recording method in accordance with the present invention, at an arbitrary time of scanning in the scanning process, a part of an end part in the sub-scanning direction of the recording pixel row may be thinned out and a remaining part is recorded, and a thinning-out part is recorded at another time of scanning.

According to this structure, a portion between regions recorded by respective scanning operations are blurred and a streak referred to as a band stripe extended in the scanning direction is prevented from being formed.

An inkjet recording apparatus in accordance with the present invention includes nozzle arrays of "n" rows ("n" is a natural number of 3 or more) for ejecting ink of the same color, the nozzle arrays of the "n" rows are scanned on a recording medium along a scanning direction and respectively eject ink on the recording medium to respectively record recording pixel rows on the recording medium, each of the nozzle arrays is comprised of one or more nozzle(s) aligned along a sub-scanning direction perpendicular to the scanning direction, and the nozzles of the respective nozzle arrays are aligned along the scanning direction, and the respective nozzle arrays of the "n" rows eject ink so that, when the recording pixel rows recorded by one scanning are extracted every "n" rows along the scanning direction, the number of permutation patterns of the nozzle arrays for recording respective rows of extracted recording pixel rows is two or more.

According to this structure, similar effects to the inkjet recording method in accordance with the present invention are attained.

Effects of the Invention

According to the inkjet recording method and the inkjet recording apparatus in accordance with the present invention, a recording image quality is improved in an inkjet recording technique with the use of a plurality of nozzle arrays for ejecting ink of the same color.

BRIEF DESCRIPTION OF DRAWINGS

FIGS. 3A and 3B are views for explaining an execution example of an inkjet recording method in accordance with an embodiment (first embodiment) of the present invention.

FIGS. 4A and 4B are views for explaining an execution example of an inkjet recording method in accordance with an embodiment (second embodiment) of the present invention.

FIGS. 8A and 8B are views for explaining an execution example of an inkjet recording method in accordance with an embodiment (fifth embodiment) of the present invention.

DESCRIPTION OF EMBODIMENTS

[First Embodiment]

Figure 1:
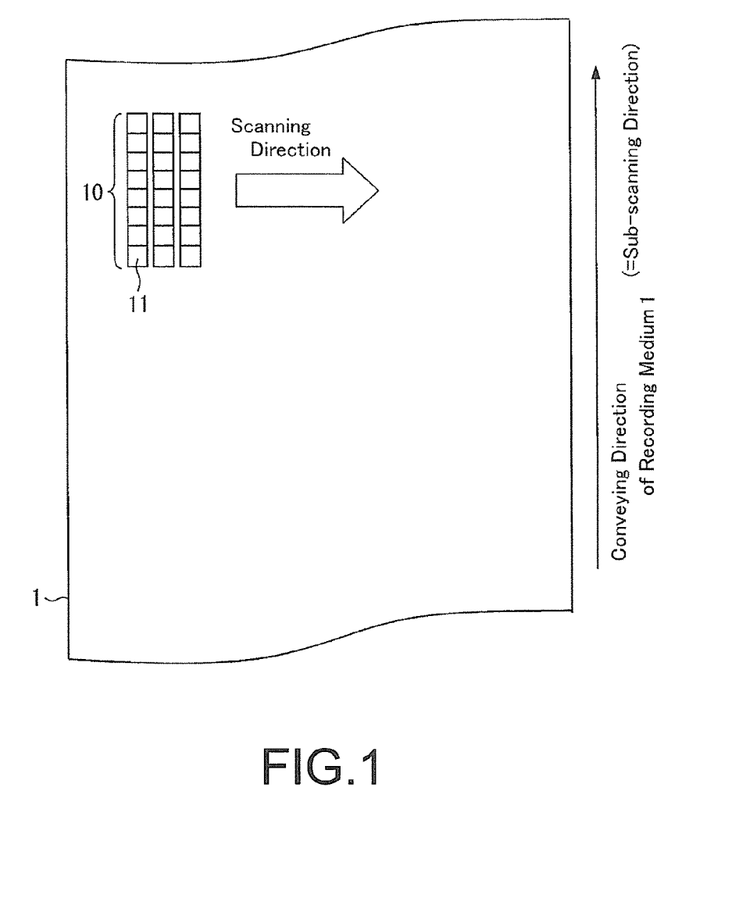
FIG. 1 is a top plan view for explaining an inkjet recording method in accordance with an embodiment (first embodiment) of the present invention.

FIG. 1 is a top plan view for explaining an inkjet recording method in accordance with an embodiment (first embodiment) of the present invention. As shown in FIG. 1, in an ink jet recording method in accordance with this embodiment, a plurality of nozzle arrays 10 are structured so as to scan on a recording medium 1 along a scanning direction. The nozzle array 10 is comprised of one or more nozzles 11 which are aligned along a sub-scanning direction perpendicular to the scanning direction and respective nozzles 11 of respective nozzle arrays 10 are aligned along the scanning direction. The respective nozzle arrays 10 for scanning on a recording medium 1 eject inks respectively to the recording medium 1 to respectively record pixel rows (also referred to as "recording pixel rows" in the present specification) which are aligned in the sub-scanning direction. When one scanning is completed, the recording medium 1 is conveyed in the sub-scanning direction and recording can be further continued.

In the present specification, "recording" means that an image is formed on a recording medium by ejecting ink on the recording medium. Further, one scanning means that scanning is performed from one end of a recording medium 1 to its other end.

Figure 2:
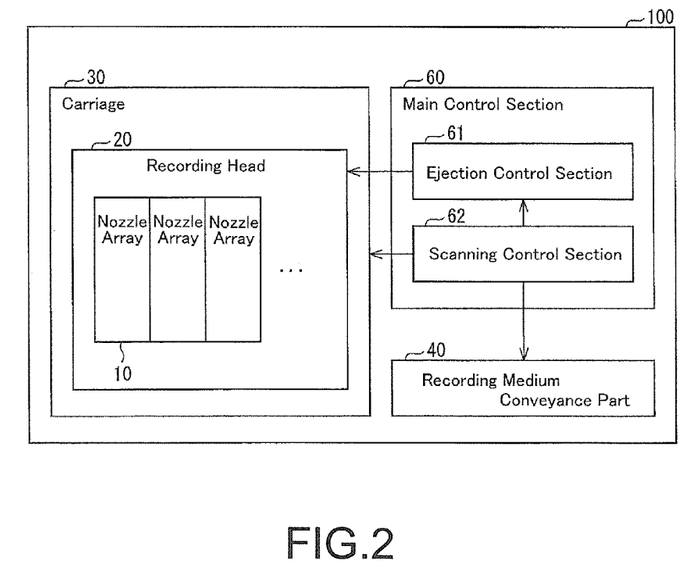
FIG. 2 is a block diagram showing a schematic structure of an inkjet recording apparatus in accordance with an embodiment (first embodiment) of the present invention.

FIG. 2 is a block diagram showing a schematic structure of an example of an inkjet recording apparatus 100 which is used in an inkjet recording method in accordance with this embodiment. As shown in FIG. 2, an inkjet recording apparatus 100 in accordance with this embodiment includes a plurality of nozzle arrays 10, a recording head 20, a carriage 30, a recording medium conveyance part 40 and a main control section 60. The main control section 60 includes an ejection control section 61 and a scanning control section 62.

A recording medium 1 is not particularly limited so long as it is an object to which something is to be recorded. For example, paper, cloth, sheet material such as a resin sheet or a metal sheet may be used. Further, ink for recording is not particularly limited and ink may be appropriately selected depending on material of a recording medium 1, an image to be formed on the recording medium 1, and the like.

It is sufficient that the nozzles 11 structuring the nozzle array 10 are structured to be capable of ejecting ink of the same color and publicly known inkjet nozzles may be used. Timings of ejecting ink from the respective nozzle arrays are controlled by the ejection control section 61. The number of the nozzle arrays 10 is not particularly limited but, for example, a natural number of 3 or more, a natural number of 4 or more, or a natural number of 5 or more may be utilized.

The respective nozzle arrays 10 are provided in the recording head 20. The recording head 20 is mounted on a carriage (drive part) 30 and is driven by the carriage 30. In this manner, the respective nozzle arrays 10 are capable of scanning on a recording medium 1. Further, the recording medium conveyance part 40 is structured to convey a recording medium 1 in a sub-scanning direction and is, for example, structured of publicly known conveying rollers and the like. The carriage 30 and the recording medium conveyance part 40 are controlled by the scanning control section 62.

(Schematic Operation)

Next, an execution example of an inkjet recording method in accordance with this embodiment will be described below. FIGS. 3A and 3B are views for explaining an execution example of an inkjet recording method in accordance with this embodiment. In FIGS. 3A and 3B, a direction from the left to the right in the paper face is the scanning direction.

FIG. 3A is a view showing the nozzle arrays 10 for ejecting ink in this execution example. As shown in FIG. 3A, in this execution example, ink is ejected from three rows of the nozzle array 10. The first nozzle array 10 from the left side in the paper face (also referred to as a "nozzle array-1") is comprised of eight nozzles 11 of "1-1" through "1-8" aligned in a sub-scanning direction. The second nozzle array 10 (also referred to as a "nozzle array-2") is comprised of eight nozzles 11 of "2-1" through "2-8" aligned in the sub-scanning direction. The third nozzle array 10 (also referred to as a "nozzle array-3") is comprised of eight nozzles 11 of "3-1" through "3-8" aligned in the sub-scanning direction. The nozzles 11 included in the "nozzle array-1" through the "nozzle arrays-3" are aligned in the scanning direction.

FIG. 3B is a view showing recording pixel rows 2 which are recorded on a recording medium 1 in this execution example. As shown in FIG. 3B, each of the recording pixel rows 2 is comprised of eight pixels 4 aligned in the sub-scanning direction. The numbers shown in the respective pixels 4 ("1-1" through "3-8") indicate which nozzle 11 shown in FIG. 3A is utilized for recording the pixel 4.

In the inkjet recording method in accordance with this embodiment, first, the scanning control section 62 controls the carriage 30 and makes a plurality of the nozzle arrays 10 perform scanning in the scanning direction (scanning process). Further, the ejection control section 61 performs ejection of ink from the nozzle arrays 10 at a predetermined timing during scanning. In other words, the ejection control section 61 controls so that ink is ejected when the respective nozzles 11 shown in FIG. 3A have moved to the positions corresponding to the respective nozzles 11 shown in FIG. 3B. In this manner, the recording pixel rows 2 as shown in FIG. 3B are recorded on the recording medium 1.

A recording speed can be improved by recording adjacent pixels to each other on the recording medium 1 by using different nozzles 11 as described above. This is because that a drive frequency for a single nozzle has an upper limit and thus, in comparison with a case that adjacent pixels are recorded by the same nozzle, when adjacent pixels are recorded by different nozzles, recording can be performed at a speed of approximately two times or more.

In this execution example, as shown in FIG. 3B, the ejection control section 61 controls respective nozzle arrays 10 so that, when recording pixel rows 2 recorded by one scanning are extracted every three rows that are the number of nozzle arrays 10 for ejecting ink along a scanning direction, the number of permutation patterns of the nozzle arrays 10 for recording respective rows of extracted recording pixel rows 3 is two or more. Specifically, permutation patterns of the nozzle arrays 10 for recording respective rows of extracted recording pixel rows 3 are six patterns along a scanning direction as follows: (nozzle array-1, nozzle array-2, nozzle array-3), (nozzle array-2, nozzle array-1, nozzle array-3), (nozzle array-1, nozzle array-3, nozzle array-2), (nozzle array-3, nozzle array-2, nozzle array-1), (nozzle array-2, nozzle array-3, nozzle array-1), and (nozzle array-3, nozzle array-1, nozzle array-2).

Since the ejection control section 61 controls ejection of ink from the nozzle arrays 10 as described above, unintended repetitive patterns are suppressed from being generated in an image after printing and an image quality of recording can be improved in comparison the conventional technique. This is because as follows.

Although a nozzle for printing is commonly formed within a predetermined tolerance, variation is occurred in ejection characteristics of the nozzles within the tolerance and thus unintended repetitive patterns may be generated in an image recorded on a recording medium due to the variation. In the conventional technique, recording pixel rows are recorded by using the permutation of the nozzle arrays in the recording head as it is. Therefore, as the permutation of the nozzle arrays for respectively recording the recording pixel rows arranged in a scanning direction on the recording medium, the permutation of the nozzle arrays on the recording head is repeated. Accordingly, when recording pixel rows recorded by using the nozzle arrays of "n" rows ("n" is a natural number of 3 or more) are extracted every "n" rows along the scanning direction, the number of permutation pattern of the nozzle arrays for recording the extracted recording pixel rows is one. In other words, the number of combination of nozzles for recording adjacent pixels is "n". Therefore, variation of ejection characteristics of the nozzles repeatedly appears every "n" rows with the same pattern on the recording image. Accordingly, image quality may be lowered.

On the other hand, like the present execution example, when the number of permutation patterns of the nozzle arrays 10 for recording respective rows of the extracted recording pixel rows 3 is set to be two or more, variation of ejection characteristics of the nozzles is prevented from repeatedly appearing in the recording image every "n" rows with the same pattern and influence on one image due to variation of the characteristics of the nozzle arrays is equalized and a further high-quality image can be formed.

Especially, it is preferable that, like the present execution example, ink is ejected in such a way that all permutation patterns are executed which are allowed in a range where the permutation patterns of the nozzle arrays 10 for recording respective rows of the extracted recording pixel rows 3 do not include the permutation of succeeding the same nozzle arrays 10. As a result, appearance of an unintended repetitive pattern can be appropriately suppressed while recording is performed at a high speed. However, the present embodiment is not limited to this example and it may be sufficient that two or more permutation patterns of the nozzle arrays 10 are provided for recording respective rows of extracted recording pixel rows 3. When two or more permutation patterns are provided, it can be avoided that variation of ejection characteristics of the nozzles repeatedly appears every "n" pixels with the same pattern and thus, in comparison with one permutation pattern like a conventional technique, an image quality for recording can be improved.

The above-mentioned execution example is a case in which three rows of the nozzle array 10 are used as one example. However, the present embodiment is not limited to this example and it may be preferably applicable to the present embodiment that "n" rows of the nozzle array 10 ("n" is a natural number of 3 or more) are used.

After one scanning by the nozzle arrays 10 has been completed, the recording medium conveyance part 40 conveys the recording medium 1 in the sub-scanning direction, and recording of recording pixel rows 2 on the lower stage can be successfully performed succeeding to the recording pixel rows 2 on the upper stage in FIG. 3B.

[Second Embodiment]

Next, another embodiment (second embodiment) will be described below. An inkjet recording apparatus 100 which is used in an inkjet recording method in accordance with a second embodiment is similar to that in the first embodiment. FIGS. 4A and 4B are views for explaining an execution example of an inkjet recording method in accordance with the second embodiment. In FIGS. 4A and 4B, a direction from the left to the right in the paper face is a scanning direction.

FIG. 4A is a view showing nozzle arrays 10 for ejecting ink in this execution example. As shown in FIG. 4A, in this execution example, the recording head 20 is provided with five rows of the nozzle array 10. The first nozzle array 10 from the left side in the paper face (also referred to as a "nozzle array-1") is comprised of eight nozzles 11 of "1-1" through "1-8" aligned in a sub-scanning direction. The second nozzle array 10 (also referred to as a "nozzle array-2") is comprised of eight nozzles 11 of "2-1" through "2-8" aligned in the sub-scanning direction. The third nozzle array 10 (also referred to as a "nozzle array-3") is comprised of eight nozzles 11 of "3-1" through "3-8" aligned in the sub-scanning direction. The fourth nozzle array 10 (also referred to as a "nozzle array-4") is comprised of eight nozzles 11 of "4-1" through "4-8" aligned in the sub-scanning direction. The fifth nozzle array 10 (also referred to as a "nozzle array-5") is comprised of eight nozzles 11 of "5-1" through "5-8" aligned in the sub-scanning direction. The nozzles 11 included in the "nozzle array-1" through the "nozzle arrays-5" are aligned in the scanning direction. As specifically described below, in this execution example, the nozzles for ejecting ink are limited to four rows of the nozzle array 10 selected from the "nozzle array-1" through the "nozzle array-5" and the four rows of the nozzle array 10 are appropriately reselected.

FIG. 4B is a view showing recording pixel rows 2 which are recorded on a recording medium 1 in this execution example. As shown in FIG. 4B, each of the recording pixel rows 2 is comprised of eight pixels 4 aligned in the sub-scanning direction. The numbers shown in the respective pixels 4 ("1-1" through "5-8") indicate which nozzle 11 shown in FIG. 4A is utilized to record the pixel 4.

In the inkjet recording method in accordance with this embodiment, similarly to the first embodiment, the scanning control section 62 controls the carriage 30 to make a plurality of the nozzle arrays 10 scan in the scanning direction (scanning process). Further, the ejection control section 61 ejects ink from the nozzle arrays 10 at a predetermined timing during a scanning operation. In other words, the ejection control section 61 controls so that ink is ejected when the respective nozzles 11 shown in FIG. 4A have moved to the positions corresponding to the respective nozzles 11 shown in FIG. 4B. In this manner, the recording pixel rows 2 as shown in FIG. 4B are recorded on a recording medium 1.

In this embodiment, the ejection control section 61 selects four rows of the nozzle array 10 from five rows of the nozzle array 10 provided in the recording head and ink is ejected from the four rows of the nozzle array 10. Further, the ejection control section 61 reselects four rows of the nozzle array 10 from the five rows of the nozzle array 10 for each of scanning operations or during a scanning operation (reselection process).

Specifically described with reference to FIG. 4B, first, when first four rows of the recording pixel row 2 are to be recorded, the ejection control section 61 selects a combination of (the "nozzle array-1", the "nozzle array-2", the "nozzle array-3", and the "nozzle array-4") and recording is performed. When next four rows of the recording pixel row 2 are to be recorded, the ejection control section 61 selects a combination of (the "nozzle array-2", the "nozzle array-3", the "nozzle array-4", and the "nozzle array-5") and recording is performed. When further next four rows of the recording pixel row 2 are to be recorded, the ejection control section 61 selects a combination of (the "nozzle array-1", the "nozzle array-3", the "nozzle array-4", and the "nozzle array-5") and recording is performed. When further next four rows of the recording pixel row 2 are to be recorded, the ejection control section 61 selects a combination of (the "nozzle array-1", the "nozzle array-2", the "nozzle array-4", and the "nozzle array-5") and recording is performed.

As described above, in this execution example, a plurality of nozzle arrays 10 is provided in the recording head 20, and nozzle arrays of smaller number than the number of the nozzle arrays 10 are selected and an image is recorded on a recording medium 1 while rearranging the nozzle arrays 10 for ejecting ink. As a result, the number of combinations of the nozzles 11 for recording adjacent pixels is increased and influence on one image due to variation of the characteristics of the nozzle arrays is equalized and a further high-quality image can be formed.

Further, in the nozzle array 10 from which ink is not ejected (nozzle array 10 which is not selected as the nozzle arrays 10 for ejecting ink), viscosity of ink within the nozzle may be increased to cause a problem in ink ejection. However, in the present embodiment, the nozzle arrays 10 for ejecting ink are reselected and rearranged and thus such a problem in ink ejection can be suppressed.

In this execution example, whenever four rows of the recording pixel row 2 are recorded, the nozzle arrays 10 for ejecting ink are reselected but the present embodiment is not limited to this example. It is preferable that the reselection is performed during each scanning but the reselection may be performed for each scanning. Further, it may be structured that a scanning length for one scanning is detected and a timing of reselection is selected based on the length.

Also in this execution example, similarly to the first embodiment, as shown in FIG. 4B, when recording pixel rows 2 recorded by one scanning are extracted every four rows that are the number of the selected nozzle arrays 10 along a scanning direction, the number of permutation patterns of the nozzle arrays 10 for recording respective rows of extracted recording pixel rows 3 is two or more, and the same nozzle array 10 is not succeeded. In other words, the number of permutation patterns of the nozzle arrays 10 for recording respective rows of extracted recording pixel rows 3 is 4 (four) along the scanning direction, i.e., (the "nozzle array-1", the "nozzle array-2", the "nozzle array-3" and the "nozzle array-4"), (the "nozzle array-2", the "nozzle array-3", the "nozzle array-4" and the "nozzle array-5"), (the "nozzle array-1", the "nozzle array-3", the "nozzle array-4" and the "nozzle array-5") and (the "nozzle array-1", the "nozzle array-2", the "nozzle array-4" and the "nozzle array-5"). Therefore, also from this point of view, an image quality of recording can be improved in this execution example.

Further, in this execution example, as one example, four rows of the nozzle array 10 are selected from five rows of the nozzle array 10. However, the present embodiment is not limited to this example and it may be preferably applicable to a case that "n" rows ("n" is a natural number of 3 or more) of the nozzle array 10 are selected from "m" rows ("m" is a natural number of "n+1" or more).

After one scanning by the nozzle arrays 10 has been completed, the recording medium conveyance part 40 conveys the recording medium 1 in the sub-scanning direction, and recording of recording pixel rows 2 on the lower stage can be successfully performed succeeding to the recording pixel rows 2 on the upper stage in FIG. 4B.

[Third Embodiment]

Figure 5:
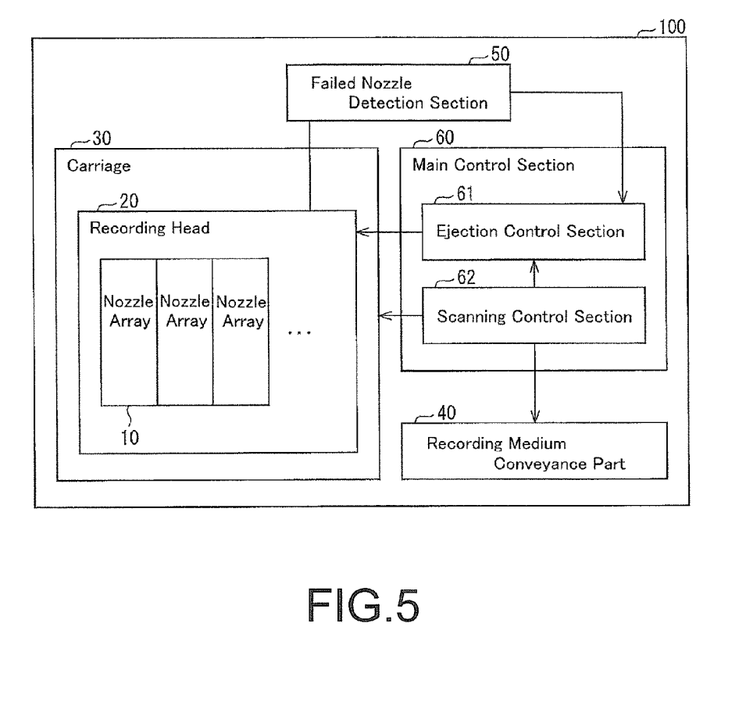
FIG. 5 is a block diagram showing a schematic structure of an inkjet recording apparatus in accordance with an embodiment (third embodiment) of the present invention.

Next, another embodiment (third embodiment) will be described below. FIG. 5 is a block diagram showing a schematic structure of an inkjet recording apparatus 100 which is used in an inkjet recording method in accordance with a third embodiment. As shown in FIG. 5, an inkjet recording apparatus 100 in accordance with this embodiment is different from the inkjet recording apparatus 100 in accordance with the first embodiment in the point that a failed nozzle detection section 50 is provided.

The failed nozzle detection section 50 detects a failed nozzle from the nozzles 11 included in the nozzle arrays 10 provided in the recording head 20. In the present specification, a "failed nozzle" means a nozzle which is unable to appropriately eject ink and, even when there is no failure in a physical mechanism, a nozzle which is unable to appropriately eject ink due to ink clogging or the like is referred to as a "failed nozzle". The failed nozzle detection section 50 may utilize a publicly known failed nozzle detection technique and is not limited especially. However, for example, it may be structured so as to judge whether ink is capable of being ejected from each nozzle 11 or not by using an optical sensor at the time of flushing processing for each scanning operation.

Figure 6A:
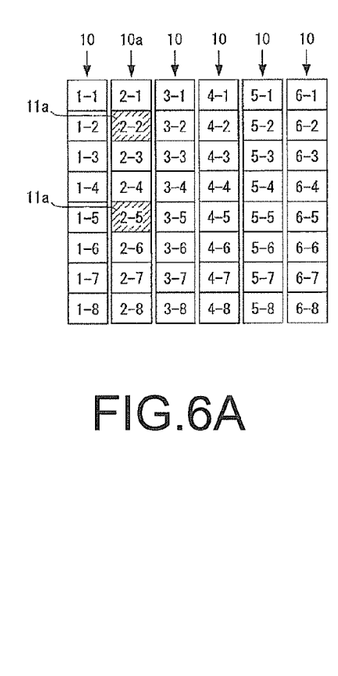
FIGS. 6A and 6B are views for explaining an execution example of an inkjet recording method in accordance with an embodiment (third embodiment) of the present invention.
Figure 6B:
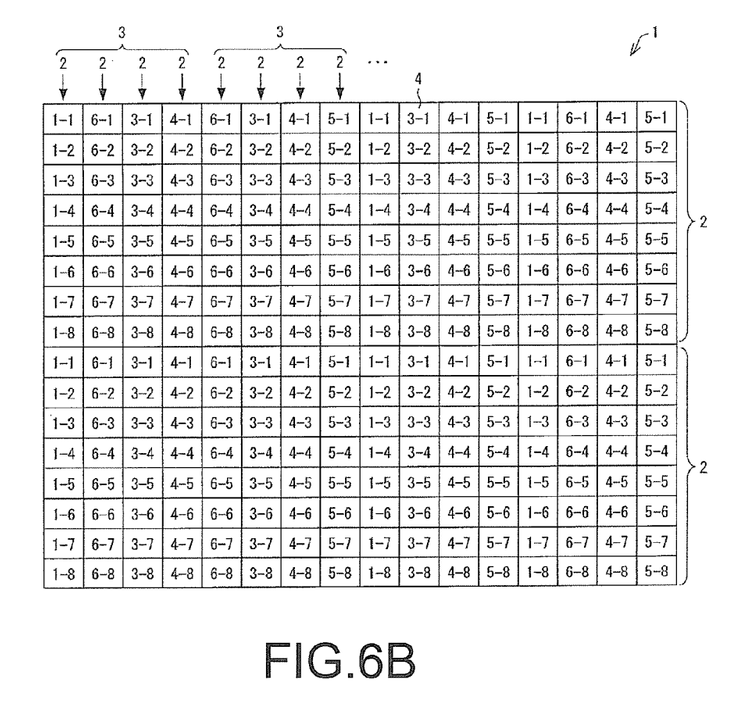

Next, an execution example of an inkjet recording method in accordance with this embodiment will be described below. FIGS. 6A and 6B are views for explaining an execution example of an inkjet recording method in accordance with this embodiment. In FIGS. 6A and 6B, a direction from the left to the right in the paper face is a scanning direction.

FIG. 6A is a view showing nozzle arrays 10 for ejecting ink in this execution example. As shown in FIG. 6A, in this execution example, the recording head 20 is provided with six rows of the nozzle array 10. The first nozzle array 10 from the left side in the paper face (also referred to as a "nozzle array-1") is comprised of eight nozzles 11 of "1-1" through "1-8" aligned in a sub-scanning direction. The second nozzle array 10 (also referred to as a "nozzle array-2") is comprised of eight nozzles 11 of "2-1" through "2-8" aligned in the sub-scanning direction. The third nozzle array 10 (also referred to as a "nozzle array-3") is comprised of eight nozzles 11 of "3-1" through "3-8" aligned in the sub-scanning direction. The fourth nozzle array 10 (also referred to as a "nozzle array-4") is comprised of eight nozzles 11 of "4-1" through "4-8" aligned in the sub-scanning direction. The fifth nozzle array 10 (also referred to as a "nozzle array-5") is comprised of eight nozzles 11 of "5-1" through "5-8" aligned in the sub-scanning direction. The sixth nozzle array 10 (also referred to as a "nozzle array-6") is comprised of eight nozzles 11 of "6-1" through "6-8" aligned in the sub-scanning direction. The nozzles 11 included in the "nozzle array-1" through the "nozzle arrays-6" are aligned in the scanning direction.

FIG. 6B is a view showing recording pixel rows 2 which are recorded on a recording medium 1 in this execution example. As shown in FIG. 6B, each of the recording pixel rows 2 is comprised of eight pixels 4 aligned in the sub-scanning direction. The numbers shown in the respective pixels 4 ("1-1" through "6-8") indicate which nozzle 11 shown in FIG. 6A is utilized to record the pixel 4.

In the inkjet recording method in accordance with this embodiment, similarly to the first embodiment, the scanning control section 62 controls the carriage 30 to make a plurality of the nozzle arrays 10 scan in the scanning direction (scanning process). Further, the ejection control section 61 ejects ink from the nozzle arrays 10 at a predetermined timing during scanning. In other words, the ejection control section 61 controls so that ink is ejected when the respective nozzles 11 shown in FIG. 6A have moved to the positions corresponding to the respective nozzles 11 shown in FIG. 6B. In this manner, the recording pixel rows 2 as shown in FIG. 6B are recorded on a recording medium 1.

In this embodiment, as shown in FIG. 6A, the nozzles 11a of the nozzle array 10a ("2-2" and "2-5", shown by the oblique lines) are failed nozzles, and the nozzle array 10a is a failed nozzle row having a failed nozzle. When the failed nozzle detection section 50 detects the failed nozzle, the result is sent to the ejection control section 61 (failed nozzle detection process).

As a result, the ejection control section 61 selects four rows of the nozzle array 10 from five rows of the nozzle array 10, in which the nozzle array 10a that is a failed nozzle row is excluded from six rows of the nozzle array provided in the recording head, and the ejection control section 61 ejects ink from the four rows of the nozzle array 10. Further, the ejection control section 61 reselects four rows of the nozzle array 10 from the five rows of the nozzle array 10 for each of scanning operations or during a scanning operation (reselection process). In this manner, the recording pixel rows 2 as shown in FIG. 6B are recorded on a recording medium 1 by the nozzle arrays 10 except the nozzle array 10a.

Normally, when a failed nozzle which is unable to appropriately eject ink is existed, recording cannot be restarted until the recording head 20 is exchanged. However, according to this embodiment, since the failed nozzle row is not used, recording can be continued without exchanging the head. In accordance with an embodiment of the present invention, detection of a failed nozzle by the failed nozzle detection section 50 may be, for example, performed for each of scanning operations. Further, even in a case that a plurality of failed nozzle rows is existed, when the number of the nozzle arrays 10 provided in the recording head 20 except the failed nozzle row is the "n" or more that is the number of the nozzle arrays 10 from which ink is to be ejected, the recording can be continued.

In this execution example, as one example, four rows of the nozzle array 10 are selected from six rows of the nozzle array 10. However, this embodiment is not limited to this example and it may be preferably applicable to a case that "n" rows ("n" is a natural number of 3 or more) of the nozzle array 10 are selected from "m" rows ("m" is a natural number of "n+1" or more).

After one scanning by the nozzle arrays 10 has been completed, the recording medium conveyance part 40 conveys the recording medium 1 in the sub-scanning direction, and recording of recording pixel rows 2 on the lower stage can be successfully performed succeeding to the recording pixel rows 2 on the upper stage in FIG. 6B.

[Fourth Embodiment]

Figure 7A:
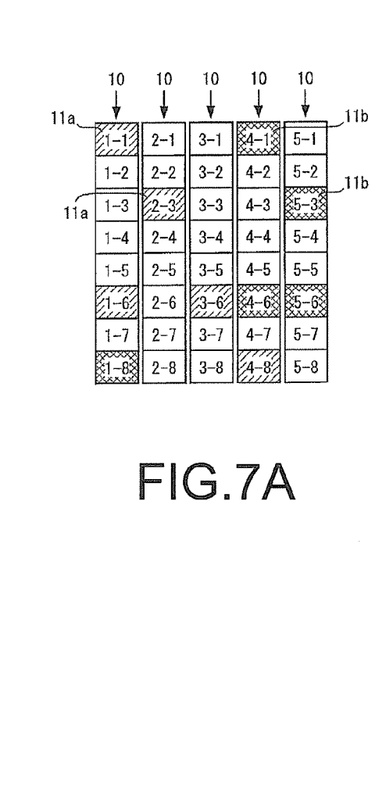
FIGS. 7A and 7B are views for explaining an execution example of an inkjet recording method in accordance with an embodiment (fourth embodiment) of the present invention.
Figure 7B:
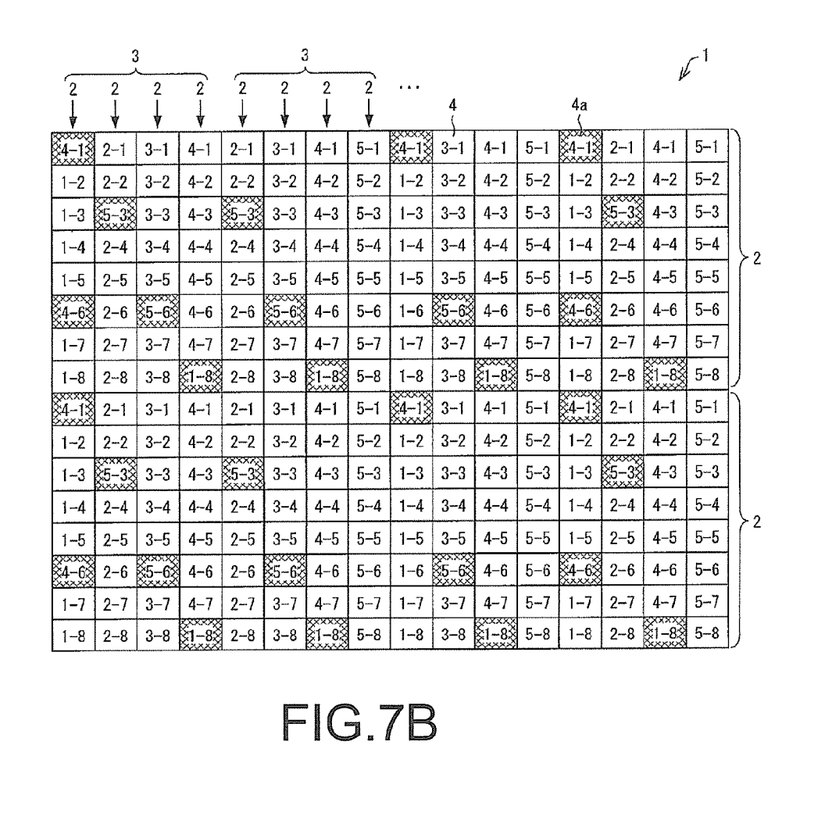

Next, another embodiment (fourth embodiment) will be described below. An inkjet recording apparatus 100 used in an inkjet recording method in accordance with a fourth embodiment is similar to that in the third embodiment. FIGS. 7A and 7B are views for explaining an execution example of an inkjet recording method in accordance with this embodiment. In FIGS. 7A and 7B, a direction from the left to the right in the paper face is a scanning direction.

FIG. 7A is a view showing nozzle arrays 10 for ejecting ink in this execution example. As shown in FIG. 7A, in this execution example, the recording head 20 is provided with five rows of the nozzle array 10. The first nozzle array 10 from the left side in the paper face (also referred to as a "nozzle array-1") is comprised of eight nozzles 11 of "1-1" through "1-8" aligned in a sub-scanning direction. The second nozzle array 10 (also referred to as a "nozzle array-2") is comprised of eight nozzles 11 of "2-1" through "2-8" aligned in the sub-scanning direction. The third nozzle array 10 (also referred to as a "nozzle array-3") is comprised of eight nozzles 11 of "3-1" through "3-8" aligned in the sub-scanning direction. The fourth nozzle array 10 (also referred to as a "nozzle array-4") is comprised of eight nozzles 11 of "4-1" through "4-8" aligned in the sub-scanning direction. The fifth nozzle array 10 (also referred to as a "nozzle array-5") is comprised of eight nozzles 11 of "5-1" through "5-8" aligned in the sub-scanning direction. The nozzles 11 included in the "nozzle array-1" through the "nozzle arrays-5" are aligned in the scanning direction.

FIG. 7B is a view showing recording pixel rows 2 which are recorded on a recording medium 1 in this execution example. As shown in FIG. 7B, each of the recording pixel rows 2 is comprised of eight pixels 4 aligned in the sub-scanning direction. The numbers shown in the respective pixels 4 ("1-1" through "5-8") indicate which nozzle 11 shown in FIG. 7A is utilized to record the pixel 4.

In the inkjet recording method in accordance with this embodiment, similarly to the first embodiment, the scanning control section 62 controls the carriage 30 to make a plurality of the nozzle arrays 10 scan in the scanning direction (scanning process). Further, the ejection control section 61 ejects ink from the nozzle arrays 10 during scanning at a predetermined timing. In other words, the ejection control section 61 controls so that ink is ejected when the respective nozzles 11 shown in FIG. 7A have moved to the positions corresponding to the respective nozzles 11 shown in FIG. 7B. In this manner, the recording pixel rows 2 as shown in FIG. 7B are recorded on the recording medium 1.

In this embodiment, as shown in FIG. 7A, nozzles 11a (("1-1", "2-3", "1-6", "3-6" and "4-8", shown by the oblique lines) are failed nozzles. When the failed nozzle detection section 50 detects the failed nozzle, the result is sent to the ejection control section 61 (failed nozzle detection process).

The ejection control section 61 selects four rows of the nozzle array 10 from five rows of the nozzle array 10 provided in the recording head, and the ejection control section 61 ejects ink from the four rows of the nozzle array 10. Further, the ejection control section 61 reselects four rows of the nozzle array 10 from the five rows of the nozzle array 10 for each of scanning operations or during scanning (reselection process). In this case, when ink is to be ejected from a failed nozzle row including a nozzle 11a detected by the failed nozzle detection section 50, the ejection control section 61 controls the respective nozzle arrays 10 so that the ink is ejected from a nozzle 11b of a substitute nozzle row which is different from the failed nozzle row instead of using the nozzle 11a.

The substitute nozzle row is selected by the ejection control section 61 so that recording pixel rows 2 recorded by the nozzle arrays 10 to which a substitute nozzle and a failed nozzle are belonged are not adjacent to each other. In other words, the substitute nozzle is selected so that a recording pixel which is originally to be recorded by the substitute nozzle and a recording pixel which is to be recorded by a failed nozzle are not adjacent to each other. For example, in FIGS. 7A and 7B, the nozzle 11b of "4-1" (shown by the crossed oblique lines in the drawing) is selected as a substitute nozzle for the nozzle 11a of "1-1" which is a failed nozzle. As shown in FIG. 7B, this is because that recording pixel rows 2 which are recorded by the "nozzle array-1" and the "nozzle array-4" are not adjacent to each other, and a recording pixel which is originally to be recorded by the nozzle 11b of "4-1" and a recording pixel which is to be recorded by the nozzle 11a of "1-1" are not adjacent to each other. Similarly, the nozzle 11b of "5-3" (shown by the crossed oblique lines in the drawing) is selected as a substitute nozzle for the nozzle 11a of "2-3" which is a failed nozzle. This is because that recording pixel rows 2 which are recorded by the "nozzle array-2" and the "nozzle array-5" are not adjacent to each other, and a recording pixel which is originally to be recorded by the nozzle 11b of "5-3" and a recording pixel which is to be recorded by the nozzle 11a of "2-3" are not adjacent to each other. The nozzle 11b of "4-6" (shown by the crossed oblique lines in the drawing) is selected as a substitute nozzle for the nozzle 11a of "1-6" which is a failed nozzle. As shown in FIG. 7B, this is because that recording pixel rows 2 which are recorded by the "nozzle array-1" and the "nozzle array-4" are not adjacent to each other, and a recording pixel which is originally to be recorded by the nozzle 11b of "4-6" and a recording pixel which is to be recorded by the nozzle 11a of "1-6" are not adjacent to each other. The nozzle 11b of "5-6" (shown by the crossed oblique lines in the drawing) is selected as a substitute nozzle for the nozzle 11a of "3-6" which is a failed nozzle. This is because that recording pixel rows 2 which are recorded by the "nozzle array-3" and the "nozzle array-5" are not adjacent to each other, and a recording pixel which is originally to be recorded by the nozzle 11b of "5-" and a recording pixel which is to be recorded by the nozzle 11a of "3-6" are not adjacent to each other. The nozzle 11b of "1-8" (shown by the crossed oblique lines in the drawing) is selected as a substitute nozzle for the nozzle 11a of "4-8" which is a failed nozzle. As shown in FIG. 7B, this is because that recording pixel rows 2 which are recorded by the "nozzle array-1" and the "nozzle array-4" are not adjacent to each other, and a recording pixel which is originally to be recorded by the nozzle 11b of "1-8" and a recording pixel which is to be recorded by the nozzle 11a of "4-8" are not adjacent to each other.

As described above, in this embodiment, a substitute nozzle is substituted for a failed nozzle and thus recording can be continued without exchanging the head. Recording can be similarly performed even when failed nozzles are existed in the same nozzle array 10 and even when failed nozzles are existed in a plurality of nozzle arrays 10. In other words, when a nozzle 11 capable of ejecting ink (not failed nozzle) is existed in the same line (line extended in the scanning direction) as the failed nozzle, recording can be continued at a speed corresponding to the number of existing nozzles 11 capable of ejecting ink.

In this execution example, as one example, four rows of the nozzle array 10 are selected from five rows of the nozzle array 10. However, this embodiment is not limited to this example and it may be preferably applicable to a case that "n" rows ("n" is a natural number of 3 or more) of the nozzle array 10 are selected from "m" rows ("m" is a natural number of "n+1" or more).

After one scanning by the nozzle arrays 10 has been completed, the recording medium conveyance part 40 conveys the recording medium 1 in the sub-scanning direction, and recording of recording pixel rows 2 on the lower stage can be successfully performed succeeding to the recording pixel rows 2 on the upper stage in FIG. 7B.

[Fifth Embodiment]

Next, another embodiment (fifth embodiment) will be described below. An inkjet recording apparatus 100 used in an inkjet recording method in accordance with a fifth embodiment is similar to that in the first embodiment. FIGS. 8A and 8B are views for explaining an execution example of an inkjet recording method in accordance with this embodiment. In FIGS. 8A and 8B, a direction from the left to the right in the paper face is a scanning direction.

FIG. 8A is a view showing nozzle arrays 10 for ejecting ink in this execution example. As shown in FIG. 8A, in this execution example, the recording head 20 is provided with five rows of the nozzle array 10. The first nozzle array 10 from the left side in the paper face (also referred to as a "nozzle array-1") is comprised of sixteen nozzles 11 of "1-1" through "1-16" aligned in a sub-scanning direction. The second nozzle array 10 (also referred to as a "nozzle array-2") is comprised of sixteen nozzles 11 of "2-1" through "2-16" aligned in the sub-scanning direction. The third nozzle array 10 (also referred to as a "nozzle array3") is comprised of sixteen nozzles 11 of "3-1" through "3-16" aligned in the sub-scanning direction. The fourth nozzle array 10 (also referred to as a "nozzle array-4") is comprised of sixteen nozzles 11 of "4-1" through "4-16" aligned in the sub-scanning direction. The fifth nozzle array 10 (also referred to as a "nozzle array-5") is comprised of sixteen nozzles 11 of "5-1" through "5-16" aligned in the sub-scanning direction. The nozzles 11 included in the "nozzle array -1" through the "nozzle arrays-5" are aligned in the scanning direction.

FIG. 8B is a view showing recording pixel rows 2 which are recorded on a recording medium 1 in this execution example. As shown in FIG. 8B, each of the recording pixel rows 2 is comprised of pixels 4 aligned in the sub-scanning direction. The numbers shown in the respective pixels 4 ("1-1" through "5-16") indicate which nozzle 11 shown in FIG. 8A is utilized to record the pixel 4.

In the inkjet recording method in accordance with this embodiment, similarly to the first embodiment, the scanning control section 62 controls the carriage 30 to make a plurality of the nozzle arrays 10 scan in the scanning direction (scanning process). Further, the ejection control section 61 ejects ink from the nozzle arrays 10 during scanning at a predetermined timing. In other words, the ejection control section 61 controls so that ink is ejected when the respective nozzles 11 shown in FIG. 8A have moved to the positions corresponding to the respective nozzles 11 shown in FIG. 8B. In this manner, the recording pixel rows 2 as shown in FIG. 8B are recorded on a recording medium 1.

In this embodiment, the ejection control section 61 selects four rows of the nozzle array 10 from five rows of the nozzle array 10 provided in the recording head and ink is ejected from the four rows of the nozzle array 10. Further, the ejection control section 61 reselects four rows of the nozzle array 10 from the five rows of the nozzle array 10 for each of scanning operations or during scanning (reselection process).

In addition, the ejection control section 61 controls the nozzle arrays 10 so that a part of an end part in a sub-scanning direction of a recording pixel row 2 is thinned out and a remaining part is recorded at an arbitrary time of scanning, and that the thinning-out part is recorded at another time of scanning.

Specifically described with reference to FIG. 8B, the pixels 4b shown by the oblique lines in the drawing are portions which are to be recorded another time of scanning and the ejection control section 61 controls the respective nozzle arrays 10 so as to record only white pixels 4. As shown in FIG. 8B, in this execution example, an end part in a sub-scanning direction of the recording pixel row 2 is thinned out according to a predetermined pattern so that a difference of thinning-out amounts (amount including the pixels 4b) becomes large in adjacent recording pixel rows 2. An aspect for thinning out the end part is not limited to this embodiment. An aspect such that a difference of thinning-out amounts in adjacent recording pixel rows 2 becomes large or an aspect having disorder may be preferably applicable.

The pixels 4b are recorded at another time of scanning. Specifically, after one scanning by the nozzle arrays 10 has been completed, the recording medium conveyance part 40 conveys the recording medium 1 in a sub-scanning direction by an amount of eight pixels and then, the pixels 4b in a lower stage in FIG. 8B can be successfully recorded at the next time of scanning. The pixels 4b in an upper stage in FIG. 8B are those having been recorded in the previous scanning. Recording of the pixels 4b may be performed at another time except the next time of scanning or may be partially performed over a plurality of scanning operations at the time of the next and subsequent scanning operations.

In other words, in this embodiment, the recording medium conveyance part 40 conveys a recording medium 1 by a distance shorter than a length of the recording pixel row 2 which is capable of being recorded by each nozzle array 10 for each of scanning operations. Therefore, recording can be performed on an overlapped area so as to mutually complement by a plurality of scanning operations.

In this manner, boundaries between regions (bands) recorded by respective scanning operations are blurred, and a streak referred to as a band stripe extended in the scanning direction is prevented from being formed.

(Modified Embodiment)

The first through the fifth embodiments may be combined arbitrarily. For example, in an inkjet recording method in accordance with the first embodiment, recording may be performed by further thinning out an end part of the recording pixel row 2 like the fifth embodiment.

Further, in the embodiment described above, a distance between the nozzles 11 is equivalent to resolution of a recording image. However, this embodiment is not limited to this example and printing in a double resolution can be realized by ejecting ink in a double density in a scanning direction or a sub-scanning direction by using the respective nozzle arrays 10. Such a recording method may be performed by one scanning or a plurality of scanning operations such as reciprocating scanning.

Figure 9A:
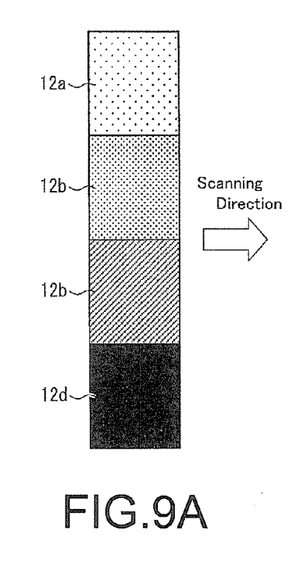
FIGS. 9A, 9B and 9C are views showing a structural example of a recording head of an inkjet recording apparatus in accordance with an embodiment of the present invention.

Further, the recording head 20 may be structured so that inks of a plurality of colors are ejected. For example, as shown in FIG. 9A, nozzle array groups 12a through 12d for ejecting inks of respective colors may be disposed in the recording head 20 along a sub-scanning direction perpendicular to the scanning direction.

The nozzle array groups 12a through 12d are configured to eject ink of colors different from each other and, for example, are configured to eject four color inks for color printing.

Further, each of the nozzle array groups 12a through 12d corresponds to a plurality of nozzle arrays 10 for ejecting ink of the same color in the first through the fifth embodiments.

Figure 9B:
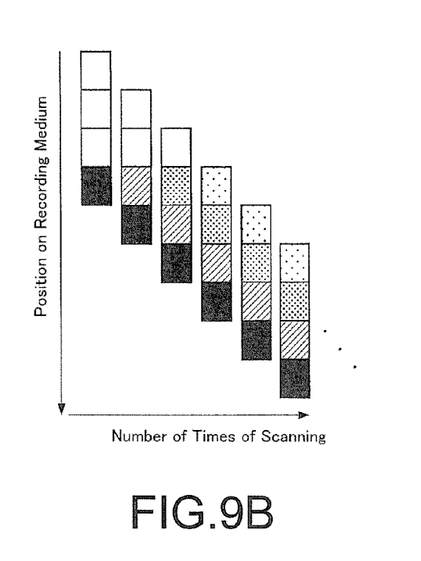

In a case that the recording head 20 is structured as described above, as shown in FIG. 9B, recording is performed while a recording medium 1 is conveyed by a width in a sub-scanning direction of the nozzle array groups 12a through 12d for each of scanning operations. As a result, inks of colors different from each other can be ejected from the respective nozzle array groups 12a through 12d so as to be superposed on each other to an arbitrary region on the recording medium 1.

Figure 9C:
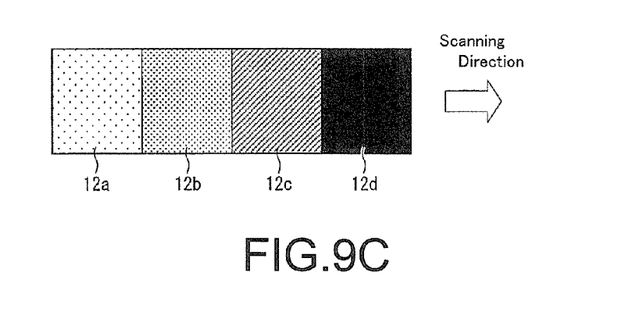

In a case that a drying speed of ink is sufficiently fast, as shown in FIG. 9C, the nozzle array groups 12a through 12d may be disposed along the scanning direction.

Further, it may be structured that the nozzle array 10 is divided into two portions and that two-pass printing is performed in which an upper half portion records a first pass and a lower half portion records a second pass to attain a further high-speed operation.

Further, a program for operating the inkjet recording apparatus 100 and for realizing functions of the inkjet recording apparatus 100 by a computer and a recording medium recorded with the program and capable of being read by a computer are also included in a category of the present invention.

(Program and Recording Medium)

Respective blocks of the main control section 60 may be realized in terms of hardware by using logical circuits formed on an integrated circuit (IC chip) or may be realized in terms of software by using a CPU (Central Processing Unit).

In the latter case, the main control section 60 includes a CPU for executing instructions of a program for realizing the respective functions, a ROM (Read Only Memory) storing the program, a RAM (Random Access Memory) developing the program, a storage device (recording medium) such as a memory storing the program and various data, and the like. An objective of the present invention can be also attained by supplying a recording medium recorded with program codes (an executable program, an intermediate code program, and a source program) of a control program for the main control section 60 as a software for realizing the above-mentioned functions so as to be readable by a computer to the main control section 60 and then, the program codes recorded in the recording medium are read out and executed by the computer (or a CPU or an MPU).

The recording medium may include, for example, tapes such as a magnetic tape or a cassette tape, disks including a magnetic disk such as a floppy (registered trademark) disk/a hard disk and an optical disk such as a CD-ROM/MO/MD/DVD/CD-R, cards such as an IC card (including a memory card)/an optical card, semiconductor memories such as a mask ROM/EPROM/EEPROM/flash ROM, or logic circuits such as a PLD (Programmable logic device) or an FPGA (Field Programmable Gate Array).

Further, it may be structured that the main control section 60 is structured so as to be capable of connecting with a communication network and the program codes are supplied through the communication network. It is sufficient that the communication network is capable of transmitting the program codes and is not limited specifically. For example, the Internet, an intranet, an extranet, a LAN, an ISDN, a VAN, a CATV communication network, a Virtual Private Network, a telephone network, a mobile communication network, a satellite communication network and the like may be utilized. Further, it is sufficient that the transmission medium structuring the communication network is capable of transmitting the program codes and is not limited to a specific structure or a specific type. For example, a wired connection such as an IEEE1394, a USB, a power-line carrier, a cable TV line, a telephone line and an ADSL (Asymmetric Digital Subscriber Line) line, or a wireless connection such as infrared rays, for example, IrDA or a remote control, Bluetooth (registered trademark), IEEE802.11 wireless, HDR (High Data Rate), NFC (Near Field Communication), DLNA (Digital Living Network Alliance), a mobile phone network, a satellite channel and a terrestrial digital network may be utilized.

The present invention is not limited to the above-mentioned embodiments and various changes and modifications will be included in a scope described in claims and embodiments obtained by appropriately combining technical means respectively disclosed in different embodiments are also included in a technical scope of the present invention.

<Additional Descriptions>

As described above, the inkjet recording methods in accordance with the first through the fifth embodiments include a scanning process in which nozzle arrays 10 of "n" rows ("n" is a natural number of 3 or more) for ejecting ink of the same color is scanned on a recording medium 1 along a scanning direction and the nozzle arrays 10 respectively eject ink on the recording medium 1 to respectively record recording pixel rows 2 on the recording medium 1, each of the nozzle arrays 10 is comprised of one or more nozzle(s) 11 aligned along a sub-scanning direction perpendicular to the scanning direction, the nozzles 11 of the respective nozzle arrays 10 are aligned along the scanning direction and, in the scanning process, the respective nozzle arrays 10 of "n" rows eject ink so that, when the recording pixel rows 2 recorded by one scanning are extracted every "n" rows along the scanning direction, the number of permutation patterns of the nozzle arrays 10 for recording respective rows of extracted recording pixel rows 3 is two or more.

In the conventional technique, recording pixel rows are recorded by using the permutation of the nozzle arrays in the recording head as it is. Therefore, when recording pixel rows recorded by using nozzle arrays of "n" rows are extracted every "n" rows along the scanning direction, the number of permutation pattern of the nozzle arrays for recording the extracted recording pixel rows is one. Accordingly, variation of ejection characteristics of the nozzles repeatedly appears every "n" rows with the same pattern on the recording image and the image quality may be lowered.

On the other hand, according to the above-mentioned structure, the number of permutation patterns of the nozzle arrays 10 for recording respective rows of the extracted recording pixel rows 3 is set to be two or more. Therefore, variation of ejection characteristics of the nozzles is prevented from repeatedly appearing every "n" rows with the same pattern in the recording image and influence on one image due to variation of the characteristics of the nozzle arrays is equalized and a further high-quality image can be formed.

In the inkjet recording methods in accordance with the second through the fifth embodiments, the nozzle arrays 10 of the "n" rows are selected from "m" rows ("m" is a natural number of "n+1" or more) of the nozzle arrays 10 provided in the recording head 20, and the scanning process includes a reselection process in which the nozzle arrays 10 of the "n" rows are reselected from the nozzle arrays 10 of the "m" rows.

According to this structure, since an image is recorded on a recording medium 1 while rearranging the nozzle arrays 10 for ejecting ink, the number of combinations of the nozzles 11 for recording adjacent pixels 4 is increased and influence on one image due to variation of the characteristics of the nozzle arrays 10 is equalized and a further high-quality image can be formed.

Further, the viscosity of ink within a nozzle which does not eject ink is successfully prevented from being increased to cause a problem in ink ejection by reselecting and rearranging the nozzle arrays 10 for ejecting ink.

The inkjet recording method in accordance with the third embodiment further includes a failed nozzle detection process in which a failed nozzle (nozzle 11a) is detected and, in the reselection process, a failed nozzle array (nozzle array 10a) including a detected failed nozzle is not selected.

According to this structure, recording can be appropriately performed without using a failed nozzle array (nozzle arrays 10a) and thus, even when a failed nozzle (nozzle 11a) is occurred, recording can be continued without exchanging the head.

The inkjet recording method in accordance with the fourth embodiment further includes a failed nozzle detection process in which a failed nozzle (nozzle 11a) is detected and, in the scanning process, when ink is to be ejected from the detected failed nozzle (nozzle 11a), ink is ejected from a substitute nozzle (nozzle 11b) instead of the failed nozzle (nozzle 11a), and the substitute nozzle (nozzle 11b) may be selected so that recording pixel rows 2 recorded by the respective nozzle arrays 10 of the substitute nozzle (nozzle 11b) and the failed nozzle (nozzle 11a) are not adjacent to each other.

According to this structure, even when a failed nozzle (nozzle 11a) is occurred, recording can be continued without exchanging the head by substituting a substitute nozzle (nozzle 11b) for the failed nozzle (nozzle 11a). Further, recording can be continued at a speed equivalent to a case having no failed nozzle (nozzle 11a) by selecting a substitute nozzle row (nozzle 11b) so that recording pixel rows 2 recorded by the respective nozzle arrays 10 of the substitute nozzle (nozzle 11b) and the failed nozzle (nozzle 11a) are not adjacent to each other.

In the inkjet recording method in accordance with the fifth embodiment, a part of an end part in a sub-scanning direction of a recording pixel row 2 is thinned out and a remaining part is recorded at an arbitrary time of scanning, and that the thinning-out part is recorded at another time of scanning.

According to this structure, a portion between regions recorded by respective scanning operations are blurred, and a streak referred to as a band stripe extended in the scanning direction is prevented from being formed.

The inkjet recording apparatus in accordance with the first through the fifth embodiments include nozzle arrays 10 of "n" rows ("n" is a natural number of 3 or more) for ejecting ink of the same color, the nozzle arrays 10 of the "n" rows are scanned on a recording medium 1 along a scanning direction and respectively eject ink on the recording medium 1 to respectively record recording pixel rows 2 on the recording medium 1, each of the nozzle arrays 10 is comprised of one or more nozzle(s) 11 aligned along a sub-scanning direction perpendicular to the scanning direction, the nozzles 11 of the respective nozzle arrays 10 are aligned along the scanning direction, and the respective nozzle arrays 10 of "n" rows eject ink so that, when the recording pixel rows 2 recorded by one scanning is extracted every "n" rows along the scanning direction, the number of permutation patterns of the nozzle arrays 10 for recording respective rows of extracted recording pixel rows 3 is two or more.

According to this structure, similar effects to the inkjet recording methods in accordance with the first through the fifth embodiments are attained.

INDUSTRIAL APPLICABILITY

The present invention may be applicable to a manufacturing field of an inkjet recording apparatus and a manufacturing field of an object to be recorded in which an inkjet recording technique is utilized.

The invention claimed is:

1. An inkjet recording method, comprising:
   a scanning process in which nozzle arrays of "n" rows for ejecting ink of same color are scanned on a recording medium along a scanning direction and the nozzle arrays respectively eject ink on the recording medium to respectively record recording pixel rows on the recording medium, wherein "n" is a natural number of 3 or more;
   wherein each of the nozzle arrays is comprised of one nozzle or more nozzles aligned along a sub-scanning direction perpendicular to the scanning direction, and the nozzles of the respective nozzle arrays are aligned along the scanning direction; and
   wherein, in the scanning process, the respective nozzle arrays of the "n" rows eject ink so that, when the recording pixel rows recorded by one scanning are extracted every "n" rows along the scanning direction, number of permutation patterns of the nozzle arrays for recording respective rows of extracted recording pixel rows is two or more.

2. The inkjet recording method according to claim 1, wherein
   the nozzle arrays of the "n" rows are selected from "m" rows of the nozzle arrays provided in a recording head, wherein "m" is a natural number of "n+1" or more, and
   the scanning process comprises: a reselection process in which the nozzle arrays of the "n" rows are reselected from the nozzle arrays of the "m" rows.

3. The inkjet recording method according to claim 2, further comprising:
   a failed nozzle detection process in which a failed nozzle is detected,
   wherein, in the reselection process, a failed nozzle array including a detected failed nozzle is not selected.

4. The inkjet recording method according to claim 2, further comprising:
   a failed nozzle detection process in which a failed nozzle is detected,
   wherein in the scanning process, when ink is to be ejected from the detected failed nozzle, ink is ejected from a substitute nozzle instead of the failed nozzle, and
   wherein the substitute nozzle is selected so that a recording pixel which is to be originally recorded by the substitute nozzle and a recording pixel which is to be recorded by the failed nozzle are not adjacent to each other.

5. The inkjet recording method according to claim 1, further comprising:
   a failed nozzle detection process in which a failed nozzle is detected,
   wherein in the scanning process, when ink is to be ejected from the detected failed nozzle, ink is ejected from a substitute nozzle instead of the failed nozzle, and
   wherein the substitute nozzle is selected so that a recording pixel which is to be originally recorded by the substitute nozzle and a recording pixel which is to be recorded by the failed nozzle are not adjacent to each other.

6. The inkjet recording method according to claim 1, wherein
   at an arbitrary time of scanning in the scanning process, a part of an end part in the sub-scanning direction of the recording pixel row is thinned out and a remaining part is recorded, and a thinning-out part is recorded at another time of scanning.

7. An inkjet recording apparatus, comprising:

nozzle arrays of "n" rows for ejecting ink of same color, wherein "n" is a natural number of 3 or more, wherein each of the nozzle arrays is comprised of one nozzle or more nozzles aligned along a sub-scanning direction perpendicular to the scanning direction, and the nozzles of the respective nozzle arrays are aligned along the scanning direction, and a main control section that controls the nozzle arrays such that:

the nozzle arrays of the "n" rows are scanned on a recording medium along a scanning direction and respectively eject ink on the recording medium to respectively record recording pixel rows on the recording medium, and the respective nozzle arrays of the "n" rows eject ink so that, when the recording pixel rows recorded by one scanning are extracted every "n" rows along the scanning direction, a number of permutation patterns of the nozzle arrays for recording respective rows of extracted recording pixel rows is two or more.

\* \* \* \* \*